(12) United States Patent
Ran et al.

(10) Patent No.: US 10,048,497 B1
(45) Date of Patent: Aug. 14, 2018

(54) SECURE PAIRING OF HEAD-MOUNTED ELECTRONIC DEVICES

(71) Applicant: INTUIT INC., Mountain View, CA (US)

(72) Inventors: Alexander S. Ran, Palo Alto, CA (US); Christopher Z. Lesner, Palo Alto, CA (US)

(73) Assignee: INTUIT INC., Mountain View, CA (US)

( * ) Notice: Subject to any disclaimer, the term of this patent is extended or adjusted under 35 U.S.C. 154(b) by 738 days.

(21) Appl. No.: 14/276,656

(22) Filed: May 13, 2014

(51) Int. Cl.
*G02B 27/01* (2006.01)
*G06F 3/00* (2006.01)

(52) U.S. Cl.
CPC ........... *G02B 27/017* (2013.01); *G06F 3/005* (2013.01)

(58) Field of Classification Search
CPC .............................. G06F 3/005; G02B 27/017
See application file for complete search history.

(56) References Cited

U.S. PATENT DOCUMENTS

| | | | | |
|---|---|---|---|---|
| 7,580,029 B2* | 8/2009 | Liu | ....................... | G06F 3/0488 345/156 |
| 8,291,408 B1* | 10/2012 | Czymontek | ............... | G06F 8/34 715/749 |
| 8,854,282 B1* | 10/2014 | Wong | ........................ | G06F 3/14 345/7 |
| 8,914,472 B1* | 12/2014 | Lee | ................... | H04L 29/06476 709/205 |
| 8,963,806 B1* | 2/2015 | Starner | .............. | G02B 27/0093 345/7 |
| 9,256,283 B2* | 2/2016 | Kang | ...................... | G06F 3/011 |
| 9,442,643 B2* | 9/2016 | Lessing | .............. | G06K 7/10237 |
| 2003/0001823 A1* | 1/2003 | Oya | ...................... | G02B 27/017 345/169 |
| 2006/0293838 A1* | 12/2006 | Yamamoto | ............. | G01C 21/20 701/532 |
| 2007/0047694 A1* | 3/2007 | Bouchard | ............... | H04M 3/38 379/67.1 |
| 2011/0113165 A1* | 5/2011 | Ryu | ...................... | G06F 13/387 710/30 |
| 2012/0209630 A1* | 8/2012 | Ihm | ........................ | G06Q 20/02 705/4 |
| 2013/0125224 A1* | 5/2013 | Kaufman | ................ | H04L 63/18 726/7 |

(Continued)

*Primary Examiner* — Sejoon Ahn
(74) *Attorney, Agent, or Firm* — Patterson & Sheridan LLP

(57) ABSTRACT

During a communication technique, a head-mounted electronic device receives a user command to capture sensory information, where the sensory information is associated with an object in an environment of the head-mounted electronic device, and where the object is associated with a second user of a second head-mounted electronic device. Then, a sensor in the head-mounted electronic device captures the sensory information associated with the object based on the received user command. Moreover, the head-mounted electronic device provides the captured sensory information to a pairing electronic device. Next, the head-mounted electronic device receives connection information from the pairing electronic device if the sensory information specifies the second user. Furthermore, the head-mounted electronic device establishes a secure connection with the second head-mounted electronic device based on the connection information.

20 Claims, 5 Drawing Sheets

(56) References Cited

U.S. PATENT DOCUMENTS

| | | | | |
|---|---|---|---|---|
| 2013/0221083 | A1* | 8/2013 | Doss | H04W 12/04 235/375 |
| 2013/0262316 | A1* | 10/2013 | Hruska | G06Q 20/227 705/67 |
| 2014/0273820 | A1* | 9/2014 | Narayan | H04W 76/023 455/41.1 |
| 2015/0023488 | A1* | 1/2015 | Lee | H04M 3/54 379/211.02 |
| 2015/0178721 | A1* | 6/2015 | Pandiarajan | G06Q 20/382 705/75 |
| 2015/0317761 | A1* | 11/2015 | Lee | G06Q 30/02 701/465 |

* cited by examiner

SECURE PAIRING OF HEAD-MOUNTED ELECTRONIC DEVICES

BACKGROUND

The present disclosure generally relates to computer-based techniques for pairing head-mounted electronic devices. More specifically, the present disclosure relates to a computer-based technique for securely pairing head-mounted electronic devices based on sensory information associated with an object located in an environment of at least one of the head-mounted electronic devices.

Because of their small size and computing capabilities, portable electronic devices are becoming increasingly popular. Recently, engineers have suggested continuing this trend by incorporating the capabilities of a portable electronic device (such as a cellular telephone) in a head-mounted electronic device. This head-mounted electronic device may include a heads-up display to seamlessly provide information about the environment around the head-mounted electronic device, and an imaging sensor to acquire information about the environment. In addition, the head-mounted electronic device may be capable of communicating with other electronic devices, such as other head-mounted electronic devices. For example, the head-mounted electronic device may be capable of exchanging information with another head-mounted electronic device through wireless communication when two individuals are proximate to each other.

It can be difficult to establish a secure peer-to-peer pairing of head-mounted electronic devices, especially in a crowded environment in which there may be multiple head-mounted electronic devices. In particular, because the head-mounted electronic device is hands free, it may be difficult for a user to manually provide information necessary to identify the peer electronic device. However, verbally providing the authentication information may create a security risk because this information may be overhead by a third party and subsequently used for a replay attack or otherwise interfered with by the third party. In the absence of user-provided authentication information, there is a need for a pairing process so that users of head-mounted electronic devices can establish secure peer-to-peer connections.

SUMMARY

The disclosed embodiments relate to a head-mounted electronic device. This head-mounted electronic device includes: a heads-up display that displays information to a user of the head-mounted electronic device; a sensor that captures sensory information associated with an object in an environment of the head-mounted electronic device, where the object is associated with a second user of a second head-mounted electronic device in the environment; a processor; a memory; and a program module, where the program module is stored in the memory and is executed by the processor to establish a secure connection with the second head-mounted electronic device associated with the second user. The program module includes: instructions for receiving a user command to capture the sensory information; instructions for capturing the sensory information associated with the object through the sensor based on the received user command; instructions for providing the captured sensory information to a pairing electronic device; instructions for receiving connection information from the pairing electronic device if the sensory information specifies the second user; and instructions for establishing the secure connection with the second head-mounted electronic device based on the connection information.

Note that the head-mounted electronic device may be included in eyewear. Moreover, the sensor may include an image sensor and/or a microphone, and the sensory information may include: an image, video and/or audio.

Furthermore, the object may include: the second user, a business card of the second user, a static Quick Response code associated with the second user, and/or a dynamically generated Quick Response code associated with the second user. Additionally, the sensory information may include: a location of the head-mounted electronic device, a direction in which the sensor is pointed, and/or a time when the sensory information is acquired. For example, the connection information may be received from the pairing electronic device if the second user is in spatial and temporal proximity to the head-mounted electronic device.

In some embodiments, prior to the instructions for receiving the user command, the program module further includes instructions for receiving a request from the second user to establish a connection with the user.

Moreover, the electronic device may include: an antenna; and a communication interface, coupled to the antenna, which establishes the secure connection based on the connection information.

Furthermore, the secure connection between the electronic device and the second head-mounted electronic device may be mediated by at least a communication electronic device associated with the user.

Additionally, the connection information may be received from the pairing electronic device if the sensory information uniquely matches additional information associated with the second user.

Another embodiment provides a method that includes at least some of the operations performed by the head-mounted electronic device. In particular, during the method, the head-mounted electronic device receives the user command to capture the sensory information, where the sensory information is associated with the object in the environment of the head-mounted electronic device, and where the object is associated with the second user. Then, the sensor in the head-mounted electronic device captures the sensory information based on the received user command. Moreover, the head-mounted electronic device provides the captured sensory information to the pairing electronic device. Next, the head-mounted electronic device receives the connection information from the pairing electronic device if the sensory information specifies the second user. Furthermore, the head-mounted electronic device establishes the secure connection with the second head-mounted electronic device based on the connection information.

Another embodiment provides a computer-program product for use with the head-mounted electronic device. This computer-program product includes instructions for at least some of the operations performed by the head-mounted electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a head-mounted electronic device, a system that includes the head-mounted electronic device, a technique for establishing a secure connection between head-mounted electronic devices, and a computer-program product (e.g., software) for use with the head-mounted electronic device are described. During this communication technique, a head-mounted electronic device receives a user command to capture sensory information, where the sensory information is associated with an object in an environment of the head-mounted electronic device, and where the object is associated with a second user of a second head-mounted electronic device. Then, a sensor in the head-mounted electronic device captures the sensory information associated with the object based on the received user command. Moreover, the head-mounted electronic device provides the captured sensory information to a pairing electronic device. Next, the head-mounted electronic device receives connection information from the pairing electronic device if the sensory information specifies the second user. Furthermore, the head-mounted electronic device establishes a secure connection with the second head-mounted electronic device based on the connection information.

By establishing the secure connection, the communication technique may allow users of the head-mounted electronic devices to quickly and reliably communicate with each other. In addition, the user(s) may acquire the sensory information used to establish the secure connection without performing a special or unusual operation with the head-mounted electronic device(s). For example, a user may acquire the sensory information using an imaging sensor in a head-mounted electronic device (as opposed to requiring the users to exchange and enter authentication information). This may improve the user experience when using the head-mounted electronic device, which may improve customer loyalty and sales of the head-mounted electronic device.

In the discussion that follows, a user may include: an individual or a person (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc. Additionally, a financial transaction may involve a product or a service (such as medical care) that is paid for using a type of currency, an asset and/or by barter. The financial transaction may be conducted by an individual and/or a business.

Figure 1:
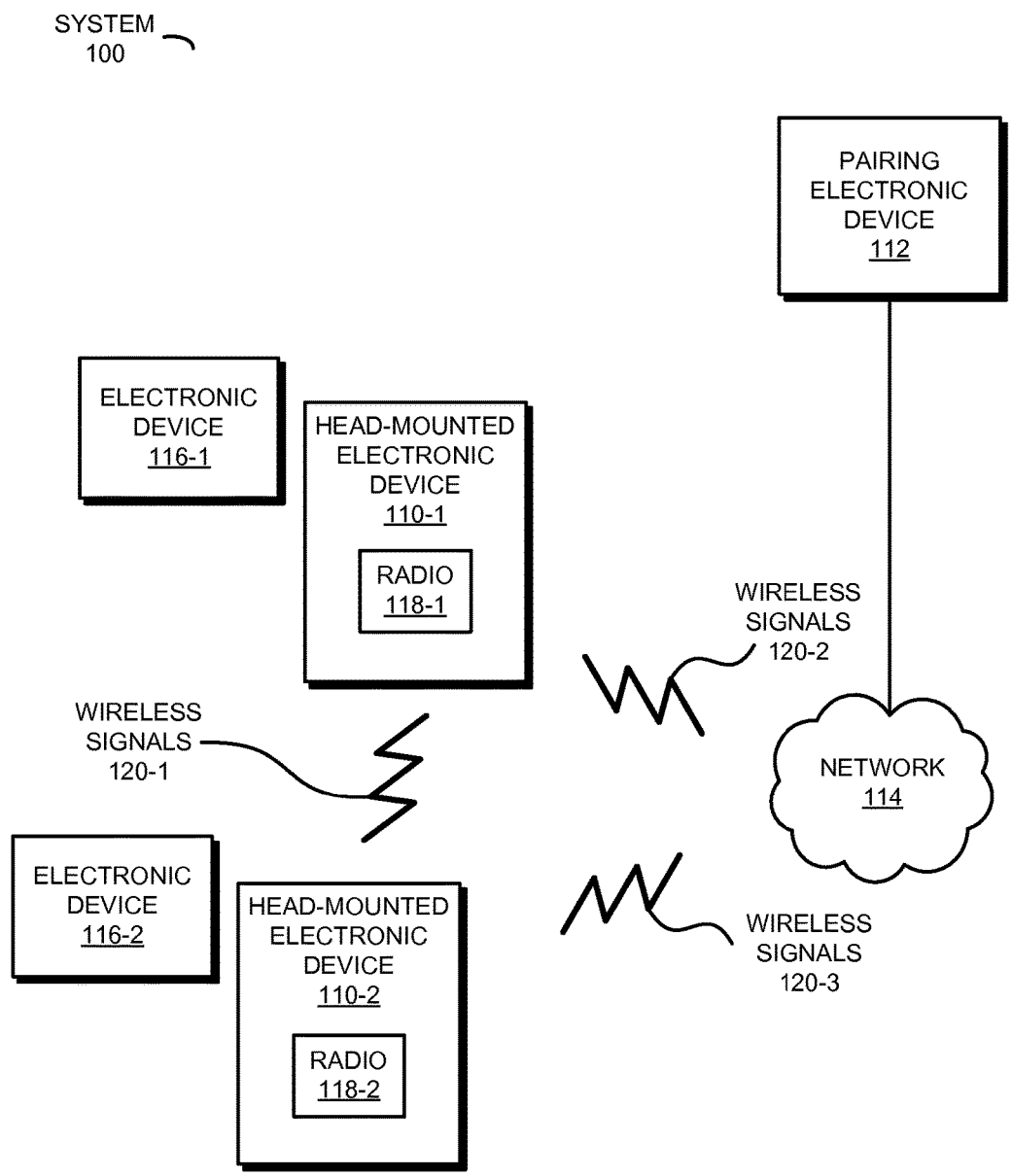
FIG. 1 is a drawing illustrating secure communication between head-mounted electronic devices in accordance with an embodiment of the present disclosure.

We now describe embodiments of the head-mounted electronic device. FIG. 1 presents a drawing illustrating secure communication between head-mounted electronic devices 110 in a system 100. In particular, either or both of head-mounted electronic devices 110 may wirelessly communicate sensory information associated with one or more objects in the environment of head-mounted electronic devices 110 with a remotely located pairing electronic device 112 (such as a computer or a server) via a network 114 (such as the Internet, a wireless network, an intranet, a cellular-telephone network, a combination of networks, and/or other technology enabling communication between electronic devices). This sensory information may have been acquired by one or more sensors in either or both of head-mounted electronic devices 110. For example, the one or more objects may be associated with either or both of the users of head-mounted electronic devices 110.

Based on the sensory information, pairing electronic device 112 may determine if it uniquely specifies either or both of the users of head-mounted electronic devices 110. If yes, pairing electronic device 112 may provide connection information to either or both of head-mounted electronic devices 110 via network 114.

Using the connection information, head-mounted electronic devices 110 may establish a secure connection between head-mounted electronic devices 110. In some embodiments, the secure connection is directly between head-mounted electronic devices 110. However, in some embodiments the secure connection is facilitated by one or more additional electronic devices (such as electronic devices 116). For example, head-mounted electronic devices 110 may each, respectively, communicate with cellular telephones of the users, which in turn communicate with each other using the secure connection. Thus, in some embodiments head-mounted electronic devices 110 indirectly communicate with each other using the secure connection.

Once the secure connection is established, head-mounted electronic devices 110 may transmit and receive packets (which may include data as payloads and, more generally, information). As described further below with reference to FIG. 5, head-mounted electronic devices 110 may include subsystems, such as a networking subsystem, a memory subsystem and a processor subsystem. In addition, head-mounted electronic devices 110 may include radios 118 in the networking subsystems. More generally, head-mounted electronic devices 110 can include (or can be included within) any electronic devices with the networking subsystems that enable head-mounted electronic devices 110 to wirelessly communicate with another electronic device. For example, head-mounted electronic devices 110 may include eyewear or glasses (which may or may not be prescription glasses) that are worn by the users, and which include networking subsystems that facilitate wireless communication between head-mounted electronic devices 110.

The wireless communication may involve a communication protocol, such as: an Institute of Electrical and Electronics Engineers (IEEE) 802.11 standard, Bluetooth™ (from the Bluetooth Special Interests Group of Kirkland, Wash.), and/or another type of wireless communication protocol. In addition, the cellular-telephone network may be compatible with a $3^{rd}$ generation of mobile telecommunications technology (such as a communication protocol that complies with the International Mobile Telecommunications-2000 specifications by the International Telecommunication Union of Geneva, Switzerland), a $4^{th}$ generation of mobile telecommunications technology (such as a communication protocol that complies with the International Mobile Telecommunications Advanced specification by the International Telecommunication Union of Geneva, Switzerland), and/or another cellular-telephone communication technique.

As can be seen in FIG. 1, wireless signals 120 (represented by jagged lines) are transmitted from one or more of radios 118 in head-mounted electronic devices 110. These wireless signals are received by one or more of radios 118 in head-mounted electronic devices 110.

In the described embodiments, processing a packet or frame in either of head-mounted electronic devices 110 includes: receiving wireless signals 120 with the packet or frame; decoding/extracting the packet or frame from received wireless signals 120 to acquire the packet or frame; and processing the packet or frame to determine the information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 2:
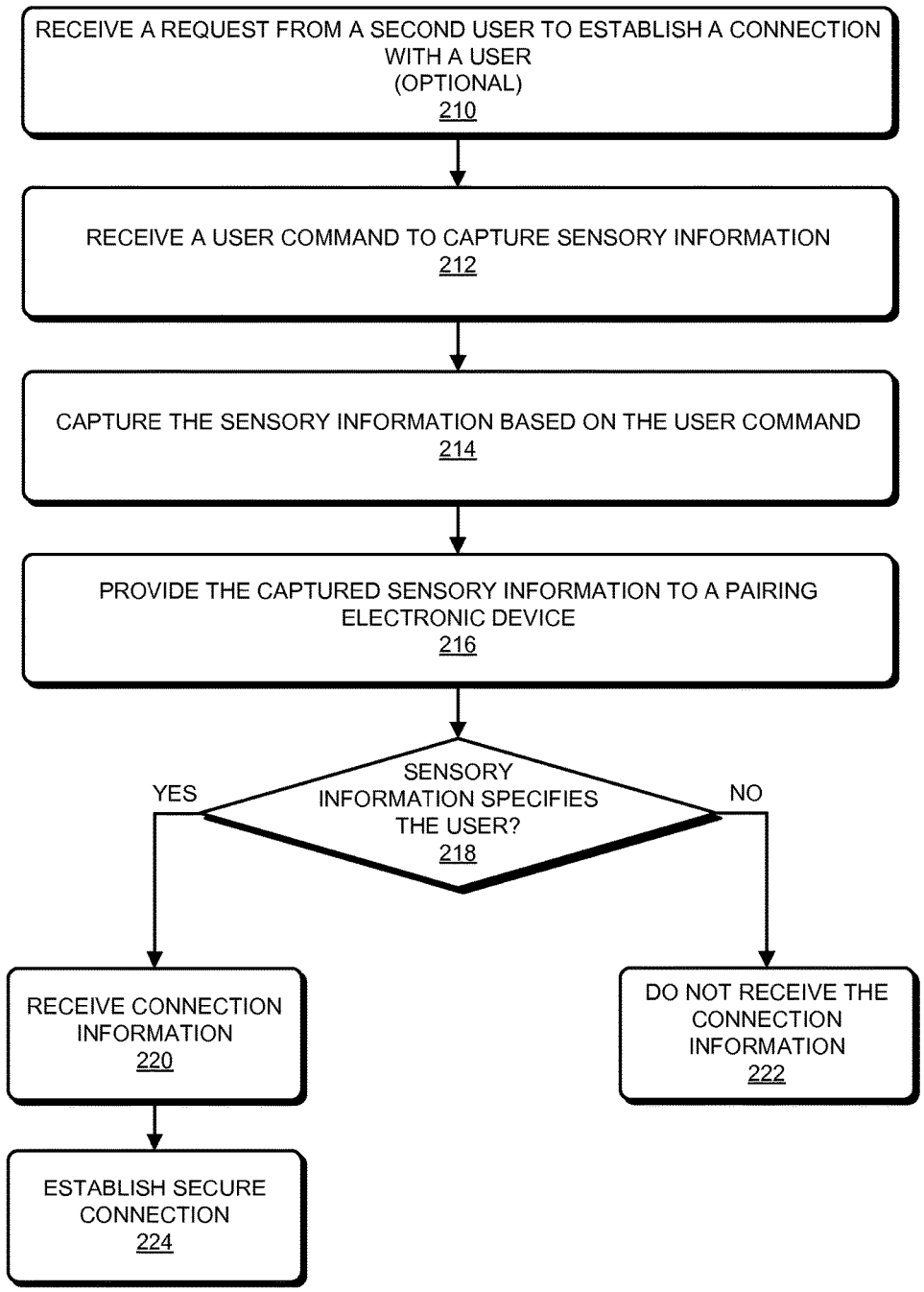
FIG. 2 is a flow chart illustrating a method for establishing a secure connection between the head-mounted electronic devices of FIG. 1 in accordance with an embodiment of the present disclosure.

We now describe embodiments of the method. FIG. 2 presents a flow chart illustrating a method 200 for establishing a secure connection between head-mounted electronic devices, such as head-mounted electronic devices 110 (FIG. 1). During operation, the head-mounted electronic device receives a user command to capture sensory information (operation 212) from a user of the head-mounted electronic device, where the sensory information is associated with an object in an environment of the head-mounted electronic device, and where the object is associated with a second user of a second head-mounted electronic device. For example, the user command may be spoken by the user into a microphone, and the head-mounted electronic device may convert the user's spoken words into the user command using a voice-recognition technique.

Then, a sensor in the head-mounted electronic device captures the sensory information based on the received user command (operation 214). This sensory information may be associated with an object in an environment of the head-mounted electronic device, and the object is associated with the second user of the second head-mounted electronic device in the environment (i.e., a different head-mounted electronic device than the one performing method 200). For example, the sensor may include an image sensor and/or a microphone, and the sensory information may include: an image, video and/or audio. Moreover, the object may include: the second user, a business card of the second user, a static Quick Response code associated with the second user, and/or a dynamically generated Quick Response code associated with the second user (which may be displayed on the second user's cellular telephone). More generally, the object may provide matchable information that the pairing electronic device can use to determine that the second user has been specified. Additionally, the sensory information may include: a location of the head-mounted electronic device (e.g., global or local positioning information, location information determined using a cellular-telephone network, etc.), a direction in which the sensor is pointed (such as the direction of the user's gaze based on a compass or an accelerometer), wireless connections to other electronic devices in the environment, a soundscape of the environment, and/or a time when the sensory information is acquired. For example, the connection information may be received from the pairing electronic device if the second user is in spatial and temporal proximity to the head-mounted electronic device.

Moreover, the head-mounted electronic device provides the captured sensory information to a pairing electronic device (operation 216).

Next, if the sensory information specifies the second user (operation 218), the head-mounted electronic device receives connection information from the pairing electronic device (operation 220). Note that the connection information may be received from the pairing electronic device (operation 220) if the sensory information uniquely matches additional information associated with the second user. For example, the second user may have previously registered with the pairing electronic device, during which the second user may have provided: one or more images of the second user, the business card of the second user, the static Quick Response code associated with the second user, etc. Thus, the pairing electronic device may perform face recognition on one or more images of the second user. However, in other embodiments method 200 does not require either the user or the second user to preregister (e.g., it may use information acquired on the spot in the environment to determine if the second user has been specified). The sensory information may be compared to the additional information in order to determine if there is a unique match.

Otherwise, if the sensory information does not specify the second user (operation 218), the head-mounted electronic device does not receive the connection information from the pairing electronic device (operation 222). Instead, the head-mounted electronic device may receive a message indicating that a match was not obtained.

Furthermore, the head-mounted electronic device establishes the secure connection with the second head-mounted electronic device based on the connection information from the pairing electronic device (operation 224). This secure connection may use symmetric or asymmetric encryption techniques as known to one of skill in the art. Once the secure connection is established, it may be used by the users of the head-mounted electronic device and the second head-mounted electronic device to exchange information.

In some embodiments, prior to the instructions for receiving the user command (operation 212), the head-mounted electronic device optionally receives a request from the second user to establish a connection with the user (operation 210). For example, the second user may verbally ask the user to establish the connection. Alternatively or additionally, the second user may perform a particular gesture or use another form of non-verbal communication to indicate that they want to establish the secure connection (such as by touching or winking at the user). In some embodiments, the second user may ask the user to perform method 200 on command to establish the secure connection. Thus, the second user may ask the user to aim the sensor at the object (e.g., to center a box on the object at the point of focus). Consequently, in method 200, the user can initiate or can accept an invitation to establish the secure connection.

Figure 3:
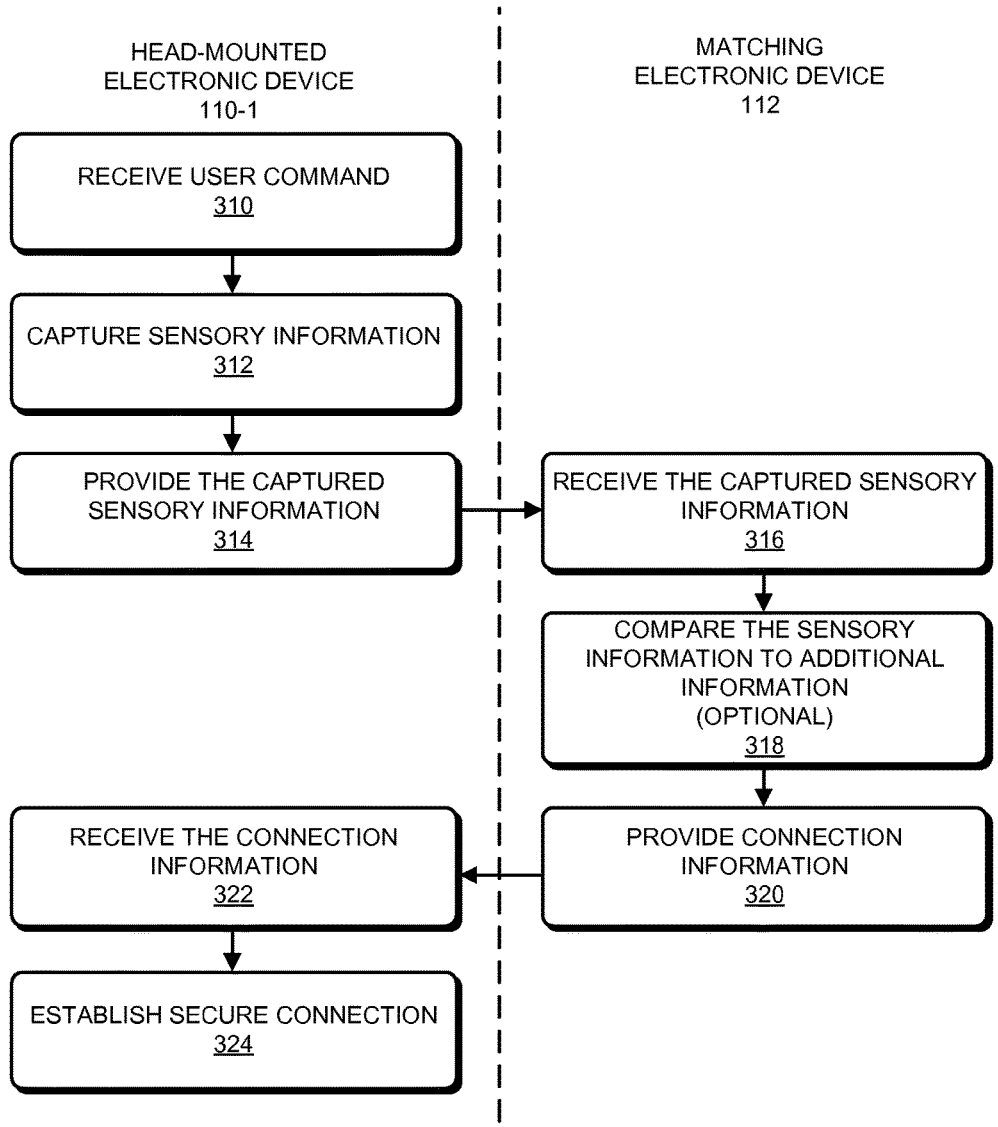
FIG. 3 is a flow chart illustrating the method of FIG. 2 in accordance with an embodiment of the present disclosure.

In an exemplary embodiment, the communication technique is implemented using one or more electronic devices (such as a computer or a portable electronic device, e.g., a cellular telephone) and one or more computers (such as a server or a computer system), which communicate through a network, such as a cellular-telephone network and/or the Internet. This is illustrated in FIG. 3, which presents a flow chart illustrating method 200.

During the method, a user of head-mounted electronic device 110-1 (such as an individual) may provide the user command to capture the sensory information, which may be received (operation 310) by head-mounted electronic device 110-1. In response, the sensor in head-mounted electronic device 110-1 may capture the sensory information (operation 312).

Then, head-mounted electronic device 110-1 may provide (operation 314) and pairing electronic device 112 may receive (operation 316) the captured sensory information. Moreover, pairing electronic device 112 may optionally compare the sensory information to additional information (operation 318) of the second user.

Based on the comparison, pairing electronic device 112 may provide (operation 320) and head-mounted electronic device 110-1 may receive (operation 322) the connection information. Using the connection information, head-mounted electronic device 110-1 may establish the secure connection (operation 324) with the second head-mounted electronic device (such as head-mounted electronic device 110-2).

Figure 4:
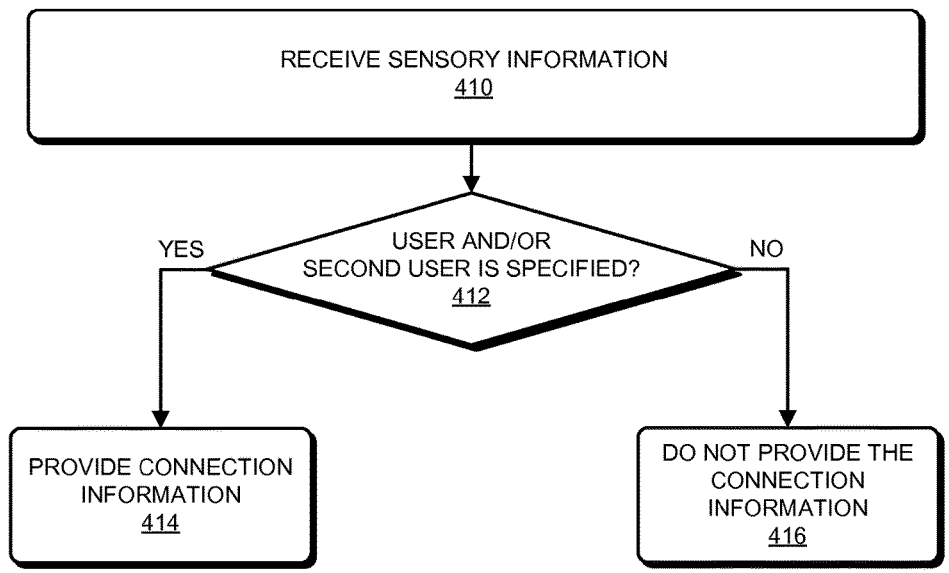
FIG. 4 is a flow chart illustrating a method for establishing a secure connection between the head-mounted electronic devices of FIG. 1 in accordance with an embodiment of the present disclosure.

FIG. 4 presents a flow chart illustrating a method 400 for establishing a secure connection between head-mounted electronic devices 110 (FIG. 1), which may be performed by a pairing electronic device, such as pairing electronic device 112 (FIG. 1). During operation, the pairing electronic device receives the sensory information from the head-mounted electronic device and/or the second head-mounted electronic device (operation 410). In response, the pairing electronic device determines if the sensory information specifies at least one of the user and the second user (operation 412). This may involve comparing the sensory information with additional information associated with the user and/or the second user. If the sensory information specifies at least one of the user and the second user (operation 412), the pairing electronic device provides the connection information to the head-mounted electronic device and/or the second head-mounted electronic device (operation 414). Otherwise (operation 412), the pairing electronic device does not provide the connection information (416). Instead, the pairing electronic device may provide a message indicating that a match was not obtained.

In some embodiments of methods 200 (FIGS. 2 and 3) and 400, there are additional or fewer operations. For example, operations 210-222 in FIG. 2 may be repeated by the second head-mounted electronic device, and the secure connection in operation 224 (FIG. 2) may only be established if the sensory information acquired by the second head-mounted electronic device and provided to the pairing electronic devices specifies the user of the head-mounted electronic device. This repetition of method 200 (FIGS. 2 and 3) by the second user of the second head-mounted electronic device may involve the same or a different object. Thus, the sensory information captured by the head-mounted electronic device and the second head-mounted electronic device may include the same audio recording or an image of the watch of one of the user and the second user. In some embodiments, the head-mounted electronic device may request a user confirmation after receiving the connection information. For example, as a security check, the user may be asked to confirm that they want to establish the secure connection with the second user while attributes of the second user are displayed on the heads-up display. In these embodiments, the secure connection may not be established until the user provides the confirmation. Moreover, the order of the operations may be changed, and/or two or more operations may be combined into a single operation.

Figure 5:
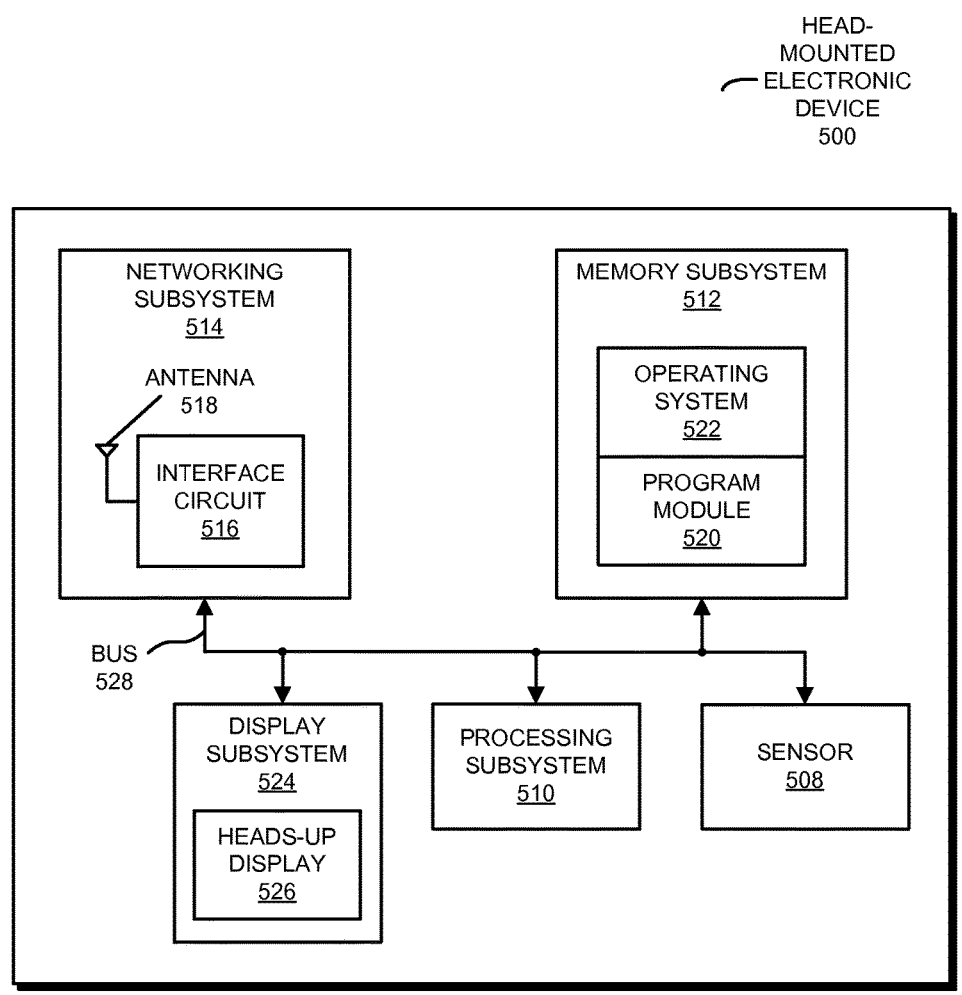
FIG. 5 is a block diagram illustrating one of the head-mounted electronic devices of FIG. 1 in accordance with an embodiment of the present disclosure.

We now describe embodiments of the head-mounted electronic device. FIG. 5 presents a block diagram illustrating head-mounted electronic device 500, which may be one of head-mounted electronic devices 110 (FIG. 1). This electronic device includes processing subsystem 510, memory subsystem 512, and networking subsystem 514. Processing subsystem 510 includes one or more devices configured to perform computational operations. For example, processing subsystem 510 can include one or more microprocessors, application-specific integrated circuits (ASICs), microcontrollers, programmable-logic devices, and/or one or more digital signal processors (DSPs).

Memory subsystem 512 includes one or more devices for storing data and/or instructions for processing subsystem 510 and networking subsystem 514. For example, memory subsystem 512 can include dynamic random access memory (DRAM), static random access memory (SRAM), and/or other types of memory. In some embodiments, instructions for processing subsystem 510 in memory subsystem 512 include: one or more program modules or sets of instructions (such as program module 520), which may be executed by processing subsystem 510. Note that the one or more computer programs may constitute a computer-program mechanism. Moreover, instructions in the various modules in memory subsystem 512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 510.

Networking subsystem 514 includes one or more devices configured to couple to and communicate on a wired and/or wireless network (i.e., to perform network operations), including: an interface circuit 516 and an antenna 518. For example, networking subsystem 514 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, head-mounted electronic device 500 may use the mechanisms in networking subsystem 514 for performing simple wireless communication between the electronic devices, e.g., transmitting advertising frames and/or scanning for advertising frames transmitted by other electronic devices.

During operation of head-mounted electronic device 500, program module 520 may be executed by processing subsystem 510. This program module may establish a secure connection between head-mounted electronic device 500 and another head-mounted electronic device. Thus, program module 520 may perform the operations in methods 200 (FIGS. 2 and 3). In particular, program module 520 may include: instructions for receiving a user command to capture the sensory information; instructions for capturing the sensory information (such as that associated with the object in the environment) using a sensor 508 in head-mounted electronic device 500 based on the received user command;

instructions for providing the captured sensory information to a pairing electronic device (e.g., via networking subsystem 514); instructions for receiving connection information from the pairing electronic device if the sensory information specifies the second user (e.g., via networking subsystem 514); and instructions for establishing the secure connection with the second head-mounted electronic device based on the connection information (e.g., via networking subsystem 514).

Within head-mounted electronic device 500, sensor 508, processing subsystem 510, memory subsystem 512, and networking subsystem 514 are coupled together using bus 528. Bus 528 may include an electrical, optical, and/or electro-optical connection that the subsystems can use to communicate commands and data among one another. Although only one bus 528 is shown for clarity, different embodiments can include a different number or configuration of electrical, optical, and/or electro-optical connections among the subsystems.

In some embodiments, the electronic device includes a display subsystem 524 for displaying information on a heads-up display 526, which may include a display driver and the heads-up display, such as a liquid-crystal display, etc. This heads-up display displays information to a user of head-mounted electronic device 500.

Head-mounted electronic device 500 can be (or can be included in) any electronic device with at least one network interface. For example, head-mounted electronic device 500 can be (or can be included in): eyeglasses, a cellular telephone, a smartphone, a media player (such as an MP3 player), a personal digital assistant (PDA), a consumer-electronic device, a portable computing device, a personal organizer, and/or another electronic device.

Although specific components are used to describe head-mounted electronic device 500, in alternative embodiments, different components and/or subsystems may be present in head-mounted electronic device 500. For example, head-mounted electronic device 500 may include one or more additional processing subsystems 510, memory subsystems 512, networking subsystems 514, and/or display subsystems 524. Additionally, one or more of the subsystems may not be present in head-mounted electronic device 500. Moreover, in some embodiments, head-mounted electronic device 500 may include one or more additional subsystems that are not shown in FIG. 5. For example, head-mounted electronic device 500 can include an audio and/or video subsystem. Also, although separate subsystems are shown in FIG. 5, in some embodiments, some or all of a given subsystem or component can be integrated into one or more of the other subsystems or component(s) in head-mounted electronic device 500. For example, in some embodiments program module 520 is included in operating system 522.

Moreover, the circuits and components in head-mounted electronic device 500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 514, such as a radio. Moreover, the integrated circuit may include hardware and/or software mechanisms that are used for transmitting wireless signals from head-mounted electronic device 500 and receiving signals at head-mounted electronic device 500 from other electronic devices. Aside from the mechanisms herein described, radios are generally known in the art and hence are not described in detail. In general, networking subsystem 514 and/or the integrated circuit can include any number of radios. Note that the radios in multiple-radio embodiments function in a similar way to the radios described in single-radio embodiments.

In some embodiments, networking subsystem 514 and/or the integrated circuit include a configuration mechanism (such as one or more hardware and/or software mechanisms) that configures the radio(s) to transmit and/or receive on a given communication channel (e.g., a given carrier frequency). Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, program module 520 can be implemented in firmware in a wireless client (such as one of head-mounted electronic devices 110 in FIG. 1). Alternatively or additionally, at least a portion of the communication technique may be implemented in a physical layer in the wireless client.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A first head-mounted electronic device, comprising: a heads-up display configured to display information to a first user of the first head-mounted electronic device; a sensor; a processor; and a memory storing a set of instructions that, when executed by the processor, perform an operation to establish a secure connection with a second head-mounted electronic device associated with a second user, the operation comprising: receiving a voice command from the first user of the first head-mounted electronic device to capture sensory information; in response to receiving the voice command, capturing, via the sensor, sensory information associated with an object identifying the second user of the second head-mounted electronic device in an environment of the first head-mounted electronic device, the sensory information comprising at least one of an image, a video, or an audio recording, the sensory information further comprising a time at which the sensory information was captured; providing the sensory information captured via the sensor to a pairing electronic device; receiving connection information from the pairing electronic device if the sensory information identifies the second user; and establishing the secure connection with the second head-mounted electronic device based on the connection information.

2. The first head-mounted electronic device of claim 1, wherein the first head-mounted electronic device and the second head-mounted electronic device are is included in eyewear.

3. The first head-mounted electronic device of claim 1, wherein the sensor includes one of: an image sensor and a microphone.

4. The first head-mounted electronic device of claim 1, wherein the object includes one of: an image of the second user, an audio recording of a voice of the second user, a business card of the second user, a static Quick Response code associated with the second user, and a dynamically generated Quick Response code associated with the second user.

5. The first head-mounted electronic device of claim 1, wherein the sensory information includes one of: a location of the first head-mounted electronic device and a direction in which the sensor is pointed.

6. The first head-mounted electronic device of claim 5, wherein the connection information is received from the pairing electronic device if the second user is in spatial proximity to the first head-mounted electronic device.

7. The first head-mounted electronic device of claim 1, the operation further comprising: prior to receiving the voice command, receiving a request from the second user to establish a connection with the first user.

8. The first head-mounted electronic device of claim 1, the operation further comprising:
converting the voice command to text using a voice-recognition technique.

9. The first head-mounted electronic device of claim 1, wherein the secure connection between the first head-mounted electronic device and the second head-mounted electronic device is mediated by at least a communication electronic device associated with the first user.

10. The first head-mounted electronic device of claim 1, wherein the connection information is received from the pairing electronic device if the sensory information uniquely matches one of an image, a video, or an audio recording, previously submitted by the second user.

11. A computer-program product for use in conjunction with a first head-mounted electronic device associated with a first user, the computer-program product comprising a set of instructions that when executed by a processor perform an operation to establish a secure connection between the first head-mounted electronic device and with a second head-mounted electronic device associated with a second user, the operation comprising: receiving a voice command from the first user of the first head-mounted electronic device to capture sensory information, the first head-mounted electronic device comprising a heads-up display; in response to receiving the voice command, capturing, via a sensor in the first head-mounted electronic device, the sensory information associated with an object in an environment of the first head-mounted electronic device, the object identifying the second user of the second head-mounted electronic device in the environment, the sensory information comprising at least one of an image, a video, or an audio recording, the sensory information further comprising a time at which the sensory information was captured; providing the sensory information captured via the sensor to a pairing electronic device; receiving connection information from the pairing electronic device if the sensory information identifies the second user; and establishing the secure connection with the second head-mounted electronic device based on the connection information.

12. The computer-program product of claim 11, wherein the first head-mounted electronic device and the second head-mounted electronic device are included in eyewear.

13. The computer-program product of claim 11, wherein the sensor includes one of: an image sensor and a microphone.

14. The computer-program product of claim 11, wherein the object includes one of: an image of the second user, an audio recording of a voice of the second user, a business card of the second user, a static Quick Response code associated with the second user, and a dynamically generated Quick Response code associated with the second user.

15. The computer-program product of claim 11, wherein the sensory information includes one of: a location of the first head-mounted electronic device and a direction in which the sensor is pointed.

16. The computer-program product of claim 15, wherein the connection information is received from the pairing electronic device if the second user is in spatial proximity to the first head-mounted electronic device.

17. The computer-program product of claim 11, the operation further comprising: prior to receiving the voice command, receiving a request from the second user to establish a connection with the first user.

18. The computer-program product of claim 11, wherein the secure connection between the first head-mounted electronic device and the second head-mounted electronic device is mediated by at least a communication electronic device associated with the first user.

19. The computer-program product of claim 11, the operation further comprising:
converting the voice command to text using a voice-recognition technique.

20. A method for establishing a secure connection between a first head-mounted electronic device associated with a first user that includes a heads-up display and a second head-mounted electronic device associated with a second user, the method comprising: receiving a voice command from the first user of the first head-mounted electronic device to capture sensory information; in response to receiving the voice command, capturing, via a sensor in the first head-mounted electronic device, sensory information associated with an object in an environment of the first head-mounted electronic device the object identifying the second user of the second head-mounted electronic device in the environment, the sensory information comprising at least one of an image, a video, or an audio recording, the sensory information further comprising a time at which the sensory information was captured; providing the sensory information captured via the sensor to a pairing electronic device; receiving connection information from the pairing electronic device if the sensory information identifies the second user; and establishing the secure connection with the second head-mounted electronic device based on the connection information.

* * * * *